Dec. 31, 1935. T. J. MARTIN 2,025,763
AUTOMATIC TRANSMISSION
Filed Oct. 18, 1934    2 Sheets-Sheet 2
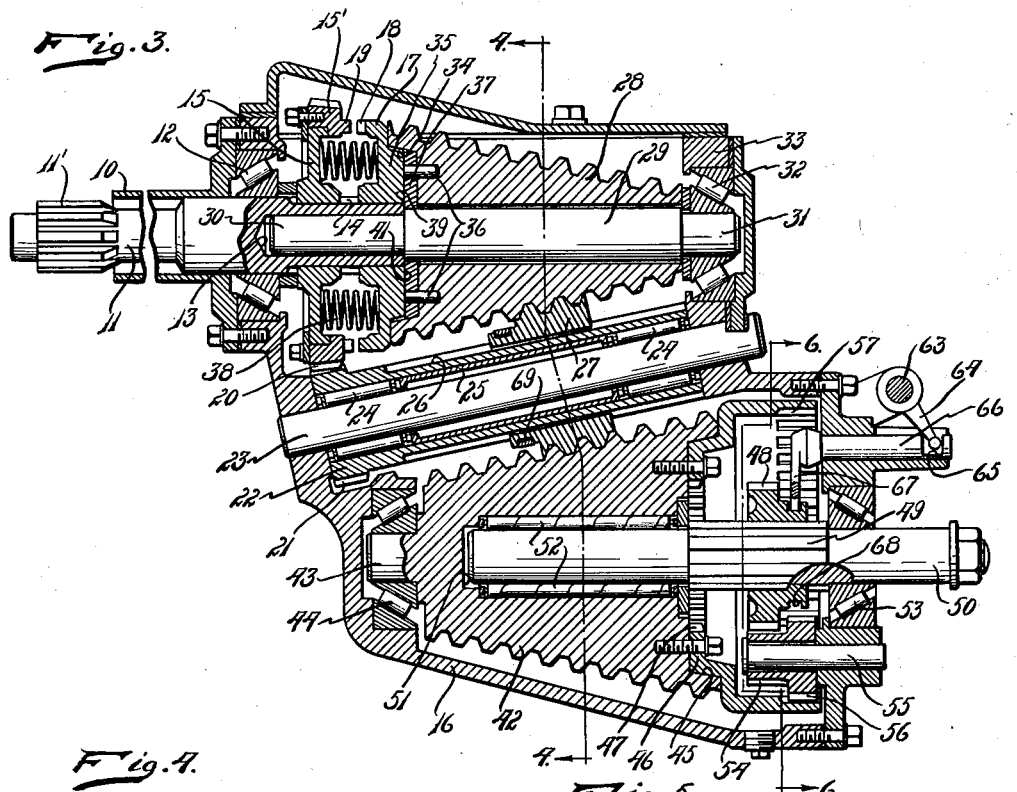
INVENTOR.
THOMAS J. MARTIN
BY
ATTORNEY.

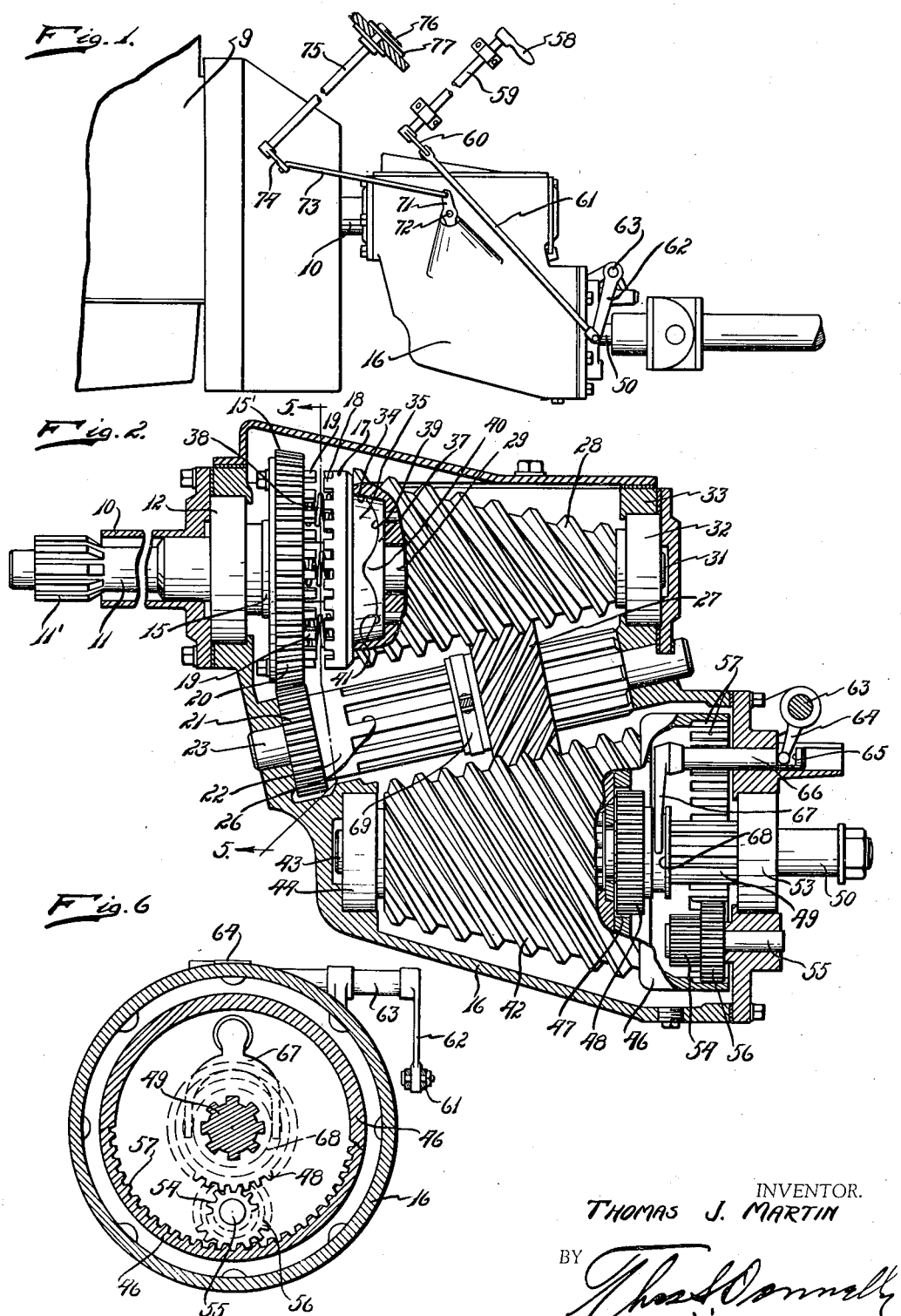

Patented Dec. 31, 1935

2,025,763

UNITED STATES PATENT OFFICE 2,025,763

AUTOMATIC TRANSMISSION

Thomas J. Martin, Ferndale, Mich.

Application October 18, 1934, Serial No. 748,804

4 Claims. (Cl. 74—337)

My invention relates to a new and useful improvement in an automatic transmission and has as its object the provision of means for transmitting power from a driving shaft to a driven shaft and so arranged and constructed that it will automatically adjust itself and regulate the ratio of transmission in relation to the relative torques of the driving shaft and the driven shaft.

Another object of the invention is the provision of a transmission of this class in which a pair of elongated cone-shaped gears may be associated with a traveling nut and faced oppositely to each other so that the traveling of the nut from one side to the other will vary the ratio of transmission.

Another object of the invention is the provision in a transmission of this class of positive means for rotating the traveling nut upon the development of a predetermined difference of torque resistance by the gear carried on the driving shaft and the gear carried on the driven shaft.

Another object of the present invention is the provision of a device of this class which will be simple of structure, economical of manufacture, durable, compact and highly efficient in use.

Other objects will appear hereinafter.

The invention consists in the combination and arrangement of parts hereinafter described and claimed.

The invention will be best understood by a reference to the accompanying drawings which form a part of the specification and in which, Fig. 1 is a side elevational view of the invention applied.

Fig. 2 is a vertical sectional view through the housing with parts broken away, parts shown in section and parts shown in side elevation.

Fig. 3 is a central vertical sectional view of the invention.

Fig. 4 is a sectional view taken on line 4—4 of Fig. 3.

Fig. 5 is a fragmentary view taken on line 5—5 of Fig. 2.

Fig. 6 is a sectional view taken on line 6—6 of Fig. 3.

In Fig. 1 I have illustrated the invention used with an internal combustion engine 9 projecting outwardly from which is the sleeve 10 through which extends the driving shaft 11 carrying the splines 11'. This shaft 11 is journaled in the bearing 12 and its inner end is hollowed to provide the socket 13. Fixedly mounted on the hollowed portion of the shaft 11 is a disk 15 on which is rotatably mounted the ring gear 15'. The inner end of the shaft 11 is provided with the splines 14 and splined to the shaft is a clutch element 17 which is provided with the face teeth 18 adapted for moving into mesh with the face teeth 19 on the gear 15'. The entire mechanism is enclosed in the housing 16. The gear 15' is also provided with peripheral teeth 20 which are adapted to mesh with the teeth 21 formed on one end of the sleeve 22. This sleeve is rotatably mounted on the shaft 23. Roller bearings 24 are located at opposite ends of the shaft 23 and held in position by the spacing sleeve 25. The sleeve 22 is provided with the splines 26 intermediate its ends and slidably mounted on this sleeve at the splined portion is the traveling nut 27. The construction is such that this nut may move axially of the sleeve 22 but always rotates in unison therewith. This nut 27 meshes with the cone-shaped spiral gear 28 which is mounted on the shaft 29. One end 30 of this shaft extends into the socket 13 and the other end 31 is journalled in the bearing 32 supported on the end wall 33 of the housing 16. The large end of the cone gear 28 is provided with a recess 34 in which is adapted to project the head 35 extending outwardly from the clutch element 17. Secured by the pins 36 on the base of the recess 34 is a friction pad 37. Springs 38 serve to normally retain the head 35 spaced from and out of mesh with the teeth 19 of the gear 15. As shown in Fig. 2 the plate 37 is provided on its outer face with a cam surface providing the valleys 39 and the lobes 40. The inner face 41 of the head 35 is provided with similar lobes. The construction is such that when the clutch element 17 rotates at a different speed than the cone gear 28 the lobes on the head 35 will ride onto the lobes 40 on the plate 37 and thus move the teeth 18 into mesh with the teeth 19 against the compression of the springs 38. When this is effected, since the clutch element 17 rotates in unison with the shaft 11, the gear 15 will be rotated so as to cause a rotation of the sleeve 22 and thus effect a traveling of the nut 27 longitudinally of the tube or sleeve 22.

This nut 27 also meshes with the spiral cone gear 42 which is provided at one end with the trunnion 43 journalled in the bearing 44. The large end of the cone gear 42 is provided with a recess 45 in which engages one end of the cup-shaped gear band 46. An opening is formed through the base of this cup-shaped gear band and teeth 47 are formed at this opening. These teeth are adapted to mesh with a gear 48 which is slidably mounted on the splined portion 49 of the shaft 50. This shaft 50 projects into the socket 51 formed in the cone gear 42 and rotates on the roller bearings 52. The opposite end of the shaft projects through the end wall of the housing and is journalled in the bearing 53. The shaft 50 forms the driven shaft. The gear 48 may also mesh with the idler gear 54 which is rotatably mounted on the shaft 55. This idler gear 54 carries the larger gear 56 which is adapted to mesh with the teeth 57 formed on the inner surface of the cup-shaped gear band 46.

By means of the hand lever 58, the rod 59, the link 60, the rod 61 and the rocker arm 62 the rotatable shaft 63 may be rocked. Fixedly mounted on this shaft 63 is the actuating arm 64 which seats in a recess 65 formed in the rod 66 which is connected to the yoke 67. This yoke engages in the peripheral groove 68 formed at one end of the gear 48. Thus there is provided a means for shifting the gear 48 into mesh with the gear 54 or into mesh with the teeth 47 as desired. In Fig. 3 I have shown the gear 48 in mesh with the gear 54.

When the engine is operated and the nut 42 is operated and the gear 48 is in the position shown in Fig. 3 the driven shaft 50 will be rotated at a low speed in reversed direction. When the gear 48 is in mesh with the teeth 47 as shown in Fig. 2 and the nut 42 is rotated the driven shaft 50 will be rotated in the straight away or the ahead direction and at a greater speed than its reverse rotation can be effected.

In operation when the driving shaft 11 is rotated the parts normally will be in the position shown in Fig. 2. It is believed obvious that the cone gear 28 may be either fixed to or loosely mounted on the shaft 29. As the engine is being driven, and the torque resistance transmitted to the nut 42 from the driven shaft 50 increases, an additional load will be transmitted to the cone gear 28 tending to slow up its rotation. As this resistance increases the cone gear 28 will gradually effect a disengagement of the clutch element 17 from the recess as this head will rotate in unison with the driving shaft 11. This will cause the cam structure embodying the valleys and lobes 39 and 40 to operate so that the teeth 18 and 19 are brought into mesh. Immediately the sleeve or tube 22 will rotate and thus cause the nut 27 to be rotated and effect its travel toward the small end of the cone-shaped gear 28 until the position is reached at which the torque resistance will be equalized, whereupon the cone gear 28 will begin to rotate at a speed in excess of the speed of rotation of the shaft 11 and thus the lobes 40 and the valleys of the cam surfaces will again assume the position shown in Fig. 2. The traveling of the nut 27 is due to the fact that the tube or sleeve 22 will be rotated at high speed because the gear 15 is much larger than the gear on the sleeve or tube 22.

In order to effect a traveling of the nut 27 toward the large end of the cone gear 28 a substantially reverse operation is effected so far as the torque resistance is concerned. To accomplish this and provide a higher ratio the driving power is decreased a little and then speeded up again. When the engine is speeded up the speed of rotation of the cone gear 42 will be increased. When the decreasing of the speed of the driving shaft is effected the cone gear 42 will still be traveling under the momentum of the higher speed so that the situation will be brought about in which the speed of the cone gear 42 will equal or exceed the speed of the cone gear 28. When the speeds are equalled there is no resistance to keep the nut 27 from sliding longitudinally of the sleeve 22 in response to the thrust delivered to the nut 27 by the action of the spiral threads and thus it will be forced to the left by this thrust. Its movement to the left will of course be quicker should the speed of the cone gear 42 exceed the speed of the cone gear 28.

A yoke 69 embraces the nut 27 and projecting outwardly from this yoke is the arm 70 which slidably projects into the sleeve 71 which is pivotally mounted on the bolt 72. Pivotally connected to one end of the arm 71 is a rod 73 which connects to the link 74 fixedly mounted on the rotatable rod 75. This rod carries at its upper end a pointer 76 cooperating with a graduated disk 77 so that the location of the nut 27 relatively to the gears 28 and 42 is always indicated and thus the gear ratio being used may always be known by the operator of the vehicle.

While I have illustrated and described the preferred form of construction I do not wish to limit myself to the precise details of structure shown but desire to avail myself of such variations and modifications as may come within the scope of the appended claims.

Having thus described my invention what I claim as new and desire to secure by Letters Patent is:

1. A transmission of the class described comprising a driving shaft; a clutch element driven by said shaft; a spiral cone gear driven by said clutch element; associated cam bosses on said clutch element and said cone gear adapted upon relative movement of said element and said cone gear for forcing said element into an inoperative position; a second spiral cone gear arranged in spaced relation to and extended oppositely to said first mentioned cone gear; a rotatable nut positioned between and meshing with each of said gears; means for rotating said nut independently of the rotation of said gears; and means operable, upon the movement of said clutch element to inoperative position, for actuating said rotating means.

2. A transmission of the class described comprising a driving shaft; a spiral cone gear driven by said shaft; a second spiral cone gear spaced from and directed oppositely to said first mentioned cone gear; a driven shaft driven by said second mentioned cone gear; a nut positioned between and meshing with each of said cone gears for transmitting rotation from one of said gears to the other; means for moving said nut axially of said gears; and means driven by said driving shaft for actuating said moving means.

3. A transmission of the class described comprising a driving shaft; a spiral cone gear driven by said driving shaft; a second spiral cone gear spaced from and faced oppositely to said first mentioned cone gear; a nut positioned between and meshing with each of said gears; a rotatable member carrying said nut, said nut being slidable longitudinally of said rotatable member and rotating in unison therewith; and means driven by said driving shaft for rotating said rotatable member.

4. A transmission of the class described, comprising: a driving shaft; a clutch element driven by said shaft; a spiral cone gear driven by said clutch element, said clutch element being movable into position and out of position for driving said spiral cone gear; resilient means for normally retaining said clutch element into position for driving said cone gear; associated cam bosses on said clutch element and said cone gear adapted upon relative movement of said clutch element and said cone gear for forcing said clutch element out of driving position relatively to said cone gear; a second spiral cone gear arranged in spaced relation to and extended oppositely to said first mentioned cone gear; a rotatable nut positioned between and meshing with each of said gears; means for rotating said nut individually of the rotation of said gears; and means engageable with and operable by said clutch element, upon the movement of said clutch element to non-driving position relative to said cone gear, for actuating said rotating means.

THOMAS J. MARTIN.